(12) United States Patent
Moghaddam et al.

(10) Patent No.: US 6,792,434 B2
(45) Date of Patent: Sep. 14, 2004

(54) CONTENT-BASED VISUALIZATION AND USER-MODELING FOR INTERACTIVE BROWSING AND RETRIEVAL IN MULTIMEDIA DATABASES

(75) Inventors: Baback Moghaddam, Cambridge, MA (US); Qi Tian, Urbana, IL (US); Xiang S. Zhou, Urbana, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 450 days.

(21) Appl. No.: 09/839,919

(22) Filed: Apr. 20, 2001

(65) Prior Publication Data

US 2002/0184229 A1 Dec. 5, 2002

(51) Int. Cl.[7] .............................................. G06F 7/00
(52) U.S. Cl. ........................ 707/104.1; 707/102; 707/3; 382/305
(58) Field of Search .................... 707/1, 100, 104.1, 707/102, 3; 382/305, 181, 190, 195, 254, 274; 345/520, 501, 538, 723, 619, 661, 664, 672, 676; 709/200, 217, 218; 715/512, 515

(56) References Cited

U.S. PATENT DOCUMENTS

| | | | | |
|---|---|---|---|---|
| 5,839,103 A | * | 11/1998 | Mammone et al. | ......... 704/232 |
| 5,915,250 A | * | 6/1999 | Jain et al. | .................... 707/100 |
| 5,918,223 A | * | 6/1999 | Blum et al. | ..................... 707/1 |
| 5,983,251 A | * | 11/1999 | Martens et al. | ............. 708/203 |
| 5,987,456 A | | 11/1999 | Ravela et al. | ................... 707/5 |
| 6,173,275 B1 | * | 1/2001 | Caid et al. | ..................... 706/14 |
| 6,240,423 B1 | * | 5/2001 | Hirata | ..................... 707/104.1 |
| 6,243,492 B1 | * | 6/2001 | Kamei | ........................ 382/181 |
| 6,400,846 B1 | * | 6/2002 | Lin et al. | ..................... 382/199 |
| 6,597,818 B2 | * | 7/2003 | Kumar et al. | ............... 382/294 |
| 6,608,923 B1 | * | 8/2003 | Zhang et al. | ............... 382/154 |

OTHER PUBLICATIONS

Hiroike et al., "Visualization of Information Spaces to Retrieve and Browsw Image Data"; Third International Conference on Visual Information Systems, Springer–Verlag, pp. 155–162, 1999.*
Hiroike et al., "Visualization for Similarity–Based Image Retrieval Systems"; pp. 171–176, 1999.
Hiroike et al., "Visualization of Information Spaces to Retrieve and Browse Image Data"; Third International Conference on Visual Information Systems, Springer–Verlag, pp. 155–162, 1999.
Musha et al., "An Interface for Visualizing Feature Space in Image Retrieval"; MVA'98, IAPR Workshop on Machine Vision Applications, 1998, pp. 447–450.
Yossi Rubner, "Perceptual Metrics for Image Database Navigation"; Dissertation submitted to Department of Computer Science of Stanford University, May, 1999.

* cited by examiner

Primary Examiner—Greta Robinson
Assistant Examiner—Miranda Le
(74) Attorney, Agent, or Firm—Dirk Brinkman; Andrew J. Curtin

(57) ABSTRACT

A method for visualizing multimedia objects assigns a feature vector to each multimedia object. The feature vector of each multimedia object is reduced to a location vector having a dimensionality of a display device. A cost function is evaluated to determine an optimal location vector for each multimedia object, and each multimedia object is displayed on a display device according to the optimal location vector. The reducing can use principle component analysis. In addition, a relevance score can be determined for each displayed multimedia object, and the multimedia objects can than be visually enhanced according to the relevance score.

19 Claims, 3 Drawing Sheets

CONTENT-BASED VISUALIZATION AND USER-MODELING FOR INTERACTIVE BROWSING AND RETRIEVAL IN MULTIMEDIA DATABASES

FIELD OF THE INVENTION

This invention relates generally to computer-based systems which provide access to multimedia databases, and more particularly to systems that visualize multimedia objects according to media characteristics.

BACKGROUND OF THE INVENTION

Traditional browsing and navigating in a large multimedia database, for example, image, video, or audio databases, is often disorienting unless a user can form a mental picture of the entire database. Content-based visualization can provide an efficient approach for browsing and navigating multimedia databases.

MEDIA FEATURES

Many browsing and retrieval systems are feature based. For example, color, texture and structure for images, color and motion for videos, ceptrum, pitch, zero crossing rate, and temporal trajectories for audio. Color is one of the most widely used features for content-based image/video analysis. It is relatively robust to background complication and independent of image size and orientation. Color histograms are the most commonly used color feature representation. While histograms are useful because they are relatively insensitive to position and orientation changes, they do not capture spatial relationship of color regions, and thus, color histograms have limited discriminating power.

One can also use color moments. There, the color distribution of an image is interpreted as a probability distribution, and the color distribution can be uniquely characterized by its moments. Characterizing a 1-D color distribution with the first three moments of color is more robust and more efficient than working with color histograms.

Texture refers to the visual pattern with properties of homogeneity that do not result from the presence of a single color or intensity. Texture contains important information about the arrangement of surfaces and the relationship of the surfaces to the surrounding environment. Texture can be represented by wavelets by processing an image into a wavelet filter bank to decompose the image into wavelet levels having a number of bands. Each band captures the feature of some scale and orientation of the original image. For each band, the standard deviation of wavelet coefficients can be extracted.

Structure is a more general feature than texture and shape. Structure captures information such as rough object size, structural complexity, loops in edges, etc. Structure does not require an uniform texture region, nor a closed shape contour. Edge-based structure features can be extracted by a so-called "water-filling algorithm," see X. Zhou, Y. Rui and T. S. Huang, "Water-filling algorithm: A novel way for image feature extraction based on edge maps," in Proc. IEEE Intl. Conf. On Image Proc., Japan, 1999, and X. S. Zhou and T. S. Huang, "Edge-based structural feature for content-based image retrieval," Pattern Recognition Letters, Vol 22/5, April 2001. pp. 457–468.

SUMMARY OF THE INVENTION

The invention visualizes multimedia objects, such as multiple images, on an output devices based on media features such as color, texture, structure, audio ceptrum, textual semantics, or any combination thereof. The vizualization can use the actual objects, or visual icons representing the objects. The resulting arrangement of multimedia objects automatically clusters objects having similar features. An original high-dimensional feature space is reduced to display space, i.e., locations having coordinates x and y, by principle component analysis (PCA).

Furthermore, the invention provides a process that optimizes the display by maximizing visibility, while minimizing deviation from the original locations of the objects. Given the original PCA-based visualization, the constrained non-linear optimization process adjust the location and size of the multimedia objects in order to minimize overlap while maintaining fidelity to the original locations of the objects which are indicative of mutual similarities. Furthermore, the appearance of specific objects in the display can be enhanced using a relevancy score.

More particularly, the invention provides a method for visualizing image objects. The method assigns a feature vector to each image. The feature vector of each image is reduced to a location vector having a dimensionality of a display device. A cost function is evaluated to determine an optimal location vector for each image, and each image is displayed on a display device according to the optimal location vector. The reducing can use principle component analysis.

DETAILED DESCRIPTION OF THE PREFERRED EMBODIMENT

Figure 1:
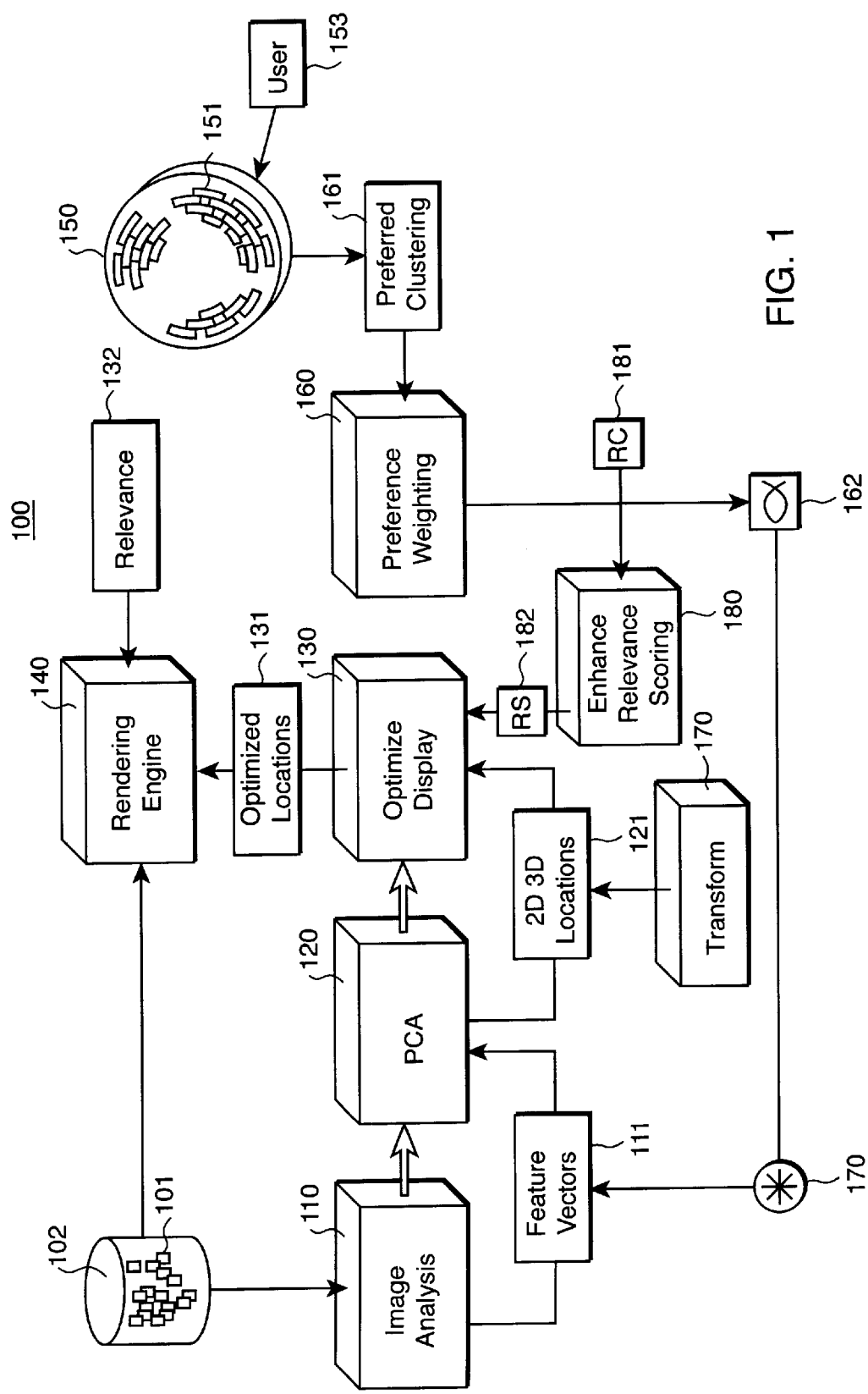
FIG. 1 is a block diagram of a method for visualizing multimedia objects according to the invention.

As shown in FIG. 1, our invention provides a method and system 100 for optimally visualizing multimedia objects, e.g., digital images, videos, or audio programs 101 on a two or three dimensional output device 150. Our visualization is based on features 111 extracted from or associated with the multimedia object 101. The features can include vision, audio, and semantic features, depending on the content of the multimedia. Our invention augments a user's perception of a multitude of multimedia objects in order to provide information that cannot be perceived by traditional browsing methods, where objects are usually displayed either randomly, or as a regular pattern of tiles.

We first extract features from the digital multimedia objects 101 stored in a multimedia database 102 using multimedia analysis 110 to produce a feature vector 111 for each object 101. For image objects, we use the HSV color space due to its de-correlated and uniform coordinates. Therefore, a nine-dimensional color feature vector, i.e., three moments for each color, is extracted from every image in the database. Texture and structure features are respectively represented by ten wavelet moments and eighteen water-filling features. As stated above, each feature vector can also be audio features, or semantic features, or any combinations of these features.

Consequently, the dimensionality of the feature vectors 111 for the multimedia can be very large, e.g., hundreds or more. Therefore, we use principle component analysis (PCA) 120 to reduce the dimensionality of the feature vectors 111. PCA is a very fast linear transformation that achieves the maximum distance preservation when projecting from high to low dimensional feature spaces. We project the feature vectors 111 to either 2D or 3D space depending on the display device 150. This projection is applied to each feature vectors 111 to produce a corresponding two or three dimensional location 121 for each multimedia object. For example, each location 121 has (x, y), (x, y, z), ($\rho$, $\theta$) or ($\rho$, $\theta$, $\phi$) coordinates. The mutual distance between object locations respects their feature similarity, thus clustering displayed objects or icons representing the objects 151 according to their features, see U.S. patent application Ser. No. 09/651,002 "Multi-User Interactive Picture Presentation System and Method," Filed by Shen et al. on Aug. 29, 2000, incorporated herein by reference.

However, if many of the objects 101 are similar in terms of their features, then it is expected that there will be a considerable amount of overlap in the visualized objects or icons because the values of the coordinates of the reduced dimensional vectors 121 will be close to each other. This will make it difficult for the user to discern all of the objects at once. It is desired to maximize visibility. This can be done by moving the objects apart, and reducing the size of the objects or icons. However, we want to maximize visibility, while minimizing deviation from the original layout, while at the same time not have the objects so small that they become indiscernible.

Optimizing Lay-Out of Display

Therefore, we provide a technique 130 that optimally displays the objects 101. We optimize 130 the location and sizes of the objects 101 using a non-linear cost function J. A number of factors are taken into consideration while minimizing the cost function J. The visibility (minimum overlap) among objects on the display device 130 is made as large as possible. The total deviation from the original location 121 on the display device 150 is at the same time made as small as possible. Furthermore, the location of each object must be on the display device, and the size of each object must be greater than a minimum size threshold. To maximize the total visibility, the objects are moved away from each other.

However, this increases the deviation of the objects from the original locations. Large deviations from the original location are undesirable when the original location of each object is important. Without increasing the total deviation, the object size can be reduced. Of course, the object size cannot be arbitrary small. Because increasing the object size will increase the amount of overlap, the initial object size is assumed to be the maximum size.

Therefore, our cost function J uses the following parameters. The number of objects that are optimized minimized is N. The original location 121 of each object i is denoted by, e.g., for a 2D display, by $\{x_i^0, y_i^0\}$, for i=1, . . . , N. Optimized locations 131 of the objects are denoted by $\{x_i, y_i\}$, for i=1, . . . , N. The maximum and minimum coordinates of the display device are $[x_{min}, x_{max}, y_{min}, y_{max}]$. For simplicity, the radius of each objects is $r_i$, for i=1, . . . , N. The maximum and minimum object size, in terms of radius, are $r_{max}$ and $r_{min}$ in radius. The original object size is $r_i=r_{max}$, for i=1, . . . , N.

The cost function J that optimizes the visualization is a linear combination of two individual cost functions that take into account the factor mentioned above.

$$J = F(p) + \lambda \cdot S \cdot G(p) \quad (1)$$

where F(p) is a cost function of total visibility, and G(p) is a cost function of the total deviation from the original location of the objects. In order to maximize the total visibility, the total amount of overlap of the objects is minimized. The value S is a scaling factor which brings the range of the cost function G(p) to the same range of the cost function F(p), and $\lambda$ is a weight, i.e., $\lambda \geq 0$. When $\lambda$ is 0, the deviation of the objects is not considered in visibility maximization. When $\lambda$ is 1, the cost functions of visibility and deviation are equally weighted. When $0 < \lambda < 1$, the minimization maximization of visibility is more important than the minimization of deviation, and vice versa for $\lambda > 1$.

The cost function F(p) of total visibility is $$F(p) = \sum_{i=1}^{N} \sum_{j=i+1}^{N} f(p), \quad (2)$$

$$\text{where } f(p) = \begin{cases} 1 - e^{-\frac{u^2}{\sigma_f}} & u > 0 \\ 0 & u \leq 0 \end{cases} \quad (3)$$

where $u = r_i + r_j - \sqrt{(x_i - x_j)^2 + (y_i - y_j)^2}$.

When $u \leq 0$, there is no overlap between the jth object and the ith object, and the cost is 0. When $u > 0$, there is partial overlap between the ith object and the jth object. When $u = 2 \cdot r_{max}$, the ith object totally obscures the jth object.

Figure 2:
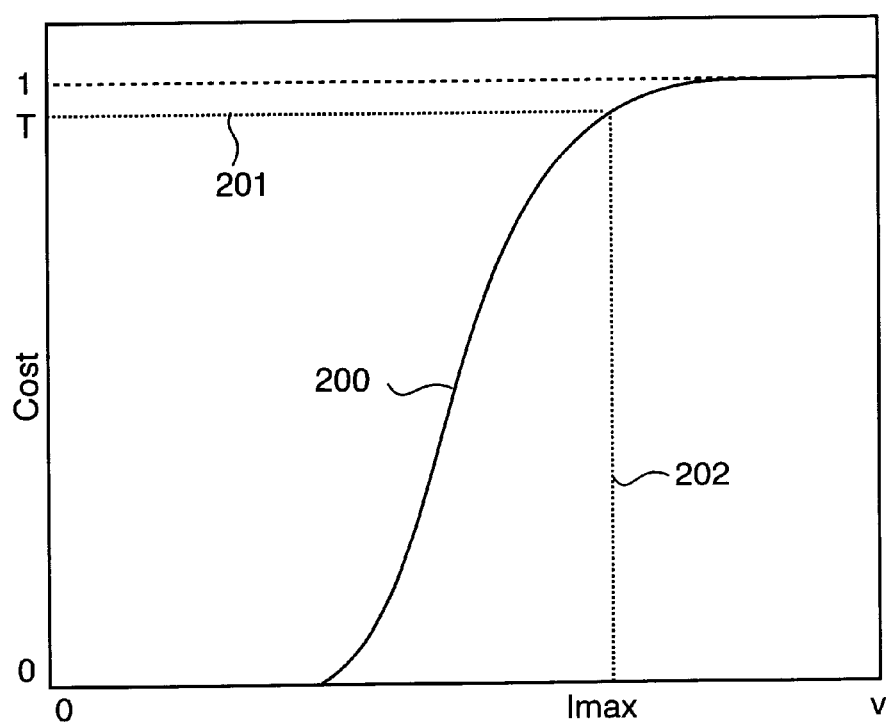
FIG. 2 is a graph of a cost function of overlap.

FIG. 2 graphs the cost function a function of u. It is clear that with the increasing value of u (u>0), the cost of overlap is also increasing. The value $\sigma_f$ in equation (3) can be determined by setting T=0.95 201 when $u = r_{max}$ 202, that is $$\sigma_f = \frac{-u^2}{\ln(1 - T)} \bigg|_{u = r_{max}}. \quad (4)$$

The cost function of total deviation is $$G(p) = \sum_{i=1}^{N} g(p) \quad (5)$$

$$g(p) = 1 - e^{-\frac{v^2}{\sigma_g}} \quad (6)$$

where $v = \sqrt{(x_i - x_i^0)^2 + (y_i - y_i^0)^2}$ is the deviation of the ith object at the optimized location ($x_i$, $y_i$) 131 from the ith object at the original locations ($x_i^0$, $y_i^0$) 111.

Figure 3:
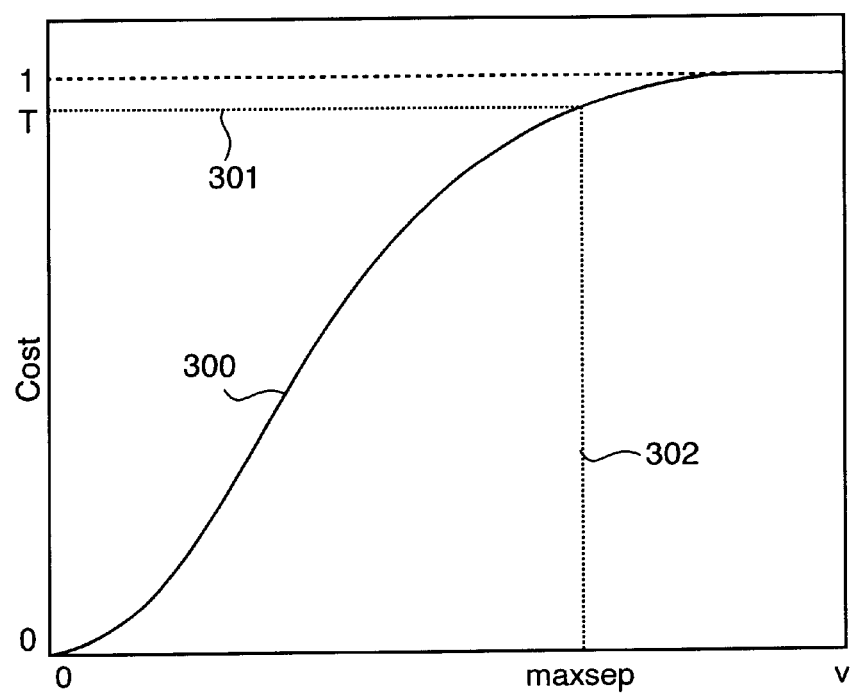
FIG. 3 is a graph of a cost function of deviation.

FIG. 3 graphs the cost function g(p) 300 as a function of deviation. It is clear that with the increasing value of v, the cost of deviation is also increasing. The value $\sigma_g$ in equation (6) is determined by setting T=0.95 301 when v=maxsep. The value maxsep 302 can be set to $2 \cdot r_{max}$. Thus, the value $\sigma_g$ is $$\sigma_g = \frac{-v^2}{\ln(1 - T)} \bigg|_{v = 2 \cdot r_{max}} \quad (7)$$

The value S in equation (1) is selected chosen to be (N−1)/2.

User Preference Clustering

In an optional step 160, we can also display the objects 101 according to a preferred arrangement selected by a user of our invention. Here, the user 153 initially places a small number of objects at preferred locations 161 on the display device 151. For example, the user places four objects at four separate arbitrary locations, e.g., objects with people, buildings, seascapes, and landscapes. More objects can be placed when the objects contain a mix of features, for example, people in front of buildings, or people on a lake or sea shore.

Given the preferred locations 161 of the user selected objects, we now place additional objects 101 on the display device 150 according to the user specified clustering.

We do this by determining a relative "feature" distance between the preferred clusters of objects. As stated above, a cluster can be as small as one object, although larger clusters will give a better result. The relative distance is expressed in terms of a weighting vector α 162. The features in the weighting vector α are identical to those in the feature vectors 111, although the weighting vector can have fewer features, for example, only visual features, or only visual and semantic feature, for example. We then apply 170 the weighting vector α 162 to each feature vector 111 before the PCA. This, surprisingly, will "skew" the optimized clustering towards the.

Determining the Weighting Vector α

We describe the estimation of α for visual feature only, e.g. color, texture, and structure, although it should be understood that any of the features 111 can be factored into α.

In this case, the weighting vector 162 is $\alpha = \{\alpha_c, \alpha_t, \alpha_s\}^T$, where $\alpha_c$ is the weight for color, $\alpha_t$ is the weight for texture, and $\alpha_s$ is the weight for structure. The number of objects in the preferred clustering is N, and $X_c$ is a $L_c \times N$ matrix where the ith column is the color feature vector of the ith object, $i=1, \ldots, N$, $X_t$ is the $L_t \times N$ matrix, the ith column is the texture feature vector of the ith object, $i=1, \ldots, N$, and $X_s$ is the $L_s \times N$ matrix, the ith column is the structure feature vector of the ith object, $i=1, \ldots, N$. The lengths of color, texture and structure features are $L_c$, $L_t$, and $L_s$ respectively. The distance, for example Euclidean or Hamming, between the ith object and the jth object, for $i, j=1, \ldots, N$, in the preferred clustering is $d_{ij}$.

We set the sum of $\alpha_c$, $\alpha_t$, $\alpha_s$ to 1, and define the best "fit" measure to be minimized as a constraint least square optimization problem where p=2.

$$J = \sum_{i=1}^{N}\sum_{j=1}^{N}\left(d_{ij}^p - \sum_{k=1}^{L_c}\alpha_c^p|X_{c(i)}^{(k)} - X_{c(j)}^{(k)}|^p - \sum_{k=1}^{L_t}\alpha_t^p|X_{t(i)}^{(k)} - X_{t(j)}^{(k)}|^p - \sum_{k=1}^{L_s}\alpha_s^p|X_{s(i)}^{(k)} - X_{s(j)}^{(k)}|^p\right)^2 \quad (8)$$

Let $$V_{(ij)}^c = \sum_{k=1}^{L_c}|X_{c(i)}^{(k)} - X_{c(j)}^{(k)}|^p \quad (9)$$

$$V_{(ij)}^t = \sum_{k=1}^{L_t}|X_{t(i)}^{(k)} - X_{t(j)}^{(k)}|^p \quad (10)$$

$$V_{(ij)}^s = \sum_{k=1}^{L_s}|X_{s(i)}^{(k)} - X_{s(j)}^{(k)}|^p \quad (11)$$

and simplify to:

$$J = \sum_{i=1}^{N}\sum_{j=1}^{N}(d_{ij}^p - \alpha_c^p V_{(ij)}^c - \alpha_t^p V_{(ij)}^t - \alpha_s^p V_{(ij)}^s)^2 \quad (12)$$

To minimize J, we take the partial derivatives of J relative to $\alpha_c^p$, $\alpha_t^p$, $\alpha_s^p$ and set the partials to zero, respectively.

We set $$\frac{\partial J}{\partial \alpha_c^p} = 0 \quad (13)$$

$$\frac{\partial J}{\partial \alpha_t^p} = 0$$

$$\frac{\partial J}{\partial \alpha_s^p} = 0$$

We have:

$$\sum_{i=1}^{N}\sum_{j=1}^{N}V_{(ij)}^{c2}\cdot\alpha_c^p + \sum_{i=1}^{N}\sum_{j=1}^{N}V_{(ij)}^c V_{(ij)}^t\cdot\alpha_t^p + \sum_{i=1}^{N}\sum_{j=1}^{N}V_{(ij)}^c V_{(ij)}^s\cdot\alpha_s^p = \quad (14)$$
$$\sum_{i=1}^{N}\sum_{j=1}^{N}d_{ij}^2 V_{(ij)}^c$$

$$\sum_{i=1}^{N}\sum_{j=1}^{N}V_{(ij)}^c V_{(ij)}^t\cdot\alpha_c^p + \sum_{i=1}^{N}\sum_{j=1}^{N}V_{(ij)}^{t2}\cdot\alpha_t^p + \sum_{i=1}^{N}\sum_{j=1}^{N}V_{(ij)}^t V_{(ij)}^s\cdot\alpha_s^p = \quad (15)$$
$$\sum_{i=1}^{N}\sum_{j=1}^{N}d_{ij}^2 V_{(ij)}^t$$

$$\sum_{i=1}^{N}\sum_{j=1}^{N}V_{(ij)}^c V_{(ij)}^s\cdot\alpha_c^p + \sum_{i=1}^{N}\sum_{j=1}^{N}V_{(ij)}^t V_{(ij)}^s\cdot\alpha_t^p + \sum_{i=1}^{N}\sum_{j=1}^{N}V_{(ij)}^{s2}\cdot\alpha_s^p = \quad (16)$$
$$\sum_{i=1}^{N}\sum_{j=1}^{N}d_{ij}^2 V_{(ij)}^s$$

We let $$A = \begin{bmatrix} \sum_{i=1}^{N}\sum_{j=1}^{N}V_{(ij)}^{c2} & \sum_{i=1}^{N}\sum_{j=1}^{N}V_{(ij)}^c V_{(ij)}^t & \sum_{i=1}^{N}\sum_{j=1}^{N}V_{(ij)}^c V_{(ij)}^s \\ \sum_{i=1}^{N}\sum_{j=1}^{N}V_{(ij)}^c V_{(ij)}^t & \sum_{i=1}^{N}\sum_{j=1}^{N}V_{(ij)}^{t2} & \sum_{i=1}^{N}\sum_{j=1}^{N}V_{(ij)}^t V_{(ij)}^s \\ \sum_{i=1}^{N}\sum_{j=1}^{N}V_{(ij)}^c V_{(ij)}^s & \sum_{i=1}^{N}\sum_{j=1}^{N}V_{(ij)}^t V_{(ij)}^s & \sum_{i=1}^{N}\sum_{j=1}^{N}V_{(ij)}^{s2} \end{bmatrix},$$

$$\beta = \begin{bmatrix} \alpha_c^p \\ \alpha_t^p \\ \alpha_s^p \end{bmatrix} \text{ and } b = \begin{bmatrix} \sum_{i=1}^{N}\sum_{j=1}^{N} d_{ij}^2 V_{(ij)}^c \\ \sum_{i=1}^{N}\sum_{j=1}^{N} d_{ij}^2 V_{(ij)}^t \\ \sum_{i=1}^{N}\sum_{j=1}^{N} d_{ij}^2 V_{(ij)}^s \end{bmatrix}$$

Equations 14–16 are simplified $$A \cdot \beta = b, \quad (17)$$

$\beta$ is calculated as a constrained least square problem. The weighting vector $\alpha$ 162 is determined by the p-th root of the $\beta$.

Location Transformation

In the preferred user specified arrangement, it is desired to have the additional objects to be located relative to the objects placed by the user. However, there is no express relationship between the user arrangement and the arrangement according to the PCA. Therefore, we apply a linear affine transform 170 to the locations 121 produced by the PCA 120. The affine transformation takes care of difference in rotation, reflection, stretching, translation and shearing transformation between the PCA produced locations 121, and the preferred clustering 161.

However, due to the collinearity and ratio of distance preserving properties, the affine transformation does not align the additional objects with the user placed objects. Therefore, we also apply a non-linear transformation, e.g., a radial basis function, to the affine transformed locations to align the objects with the preferred locations.

Enhanced Visualization

As shown in FIG. 1, the system 100 according to our invention can also selectively enhance 180 a subset of the displayed objects based on relevance criteria 181. The enhancement 180 increases the visual prominence of this subset of objects according to a relevance score 182 for each displayed object 101. The enhancement can be done by increasing the size, contrast, or brightness of the objects as a function of their relevance score 182.

The relevance 132 represents a "third" dimension of visualization, the location being the other two dimensions. The purpose of the relevance 132 is to increase the information flow, and enhance the user's perception of the displayed objects based on the current context.

In a typical scenario, a user issues an object-based query, e.g., "find me similar objects," and the system retrieves the nearest-neighboring objects, as described above, and renders the top N objects, using the alpha-weighted feature vectors 111. In this case, each object has an implicit equal "relevance," or similarity to the query. It is desired to selectively enhance the visualization, so that displayed objects that have a greater contextual relevance become more visually prominent by, for example, proportionally increasing their sizes—in which case the relevance score becomes a constraint in the optimization 130. Alternatively, the contrast or brightness of the objects can be modified, perhaps, independent of the optimization 130, or iconic information can display the actual relevance, e.g., rank number, or symbolic graphics.

The invention is described in terms that enable any person skilled in the art to make and use the invention, and is provided in the context of particular example applications and their requirements. Various modifications to the preferred embodiments will be readily apparent to those skilled in the art, and the principles described herein may be applied to other embodiments and applications without departing from the spirit and scope of the invention. Thus, the present invention is not intended to be limited to the embodiments described herein, but is to be accorded with the broadest scope of the claims below, consistent with the principles and features disclosed herein.

We claim:

1. A method for visualizing a plurality of stored multimedia objects on a display device:

placing a set of user selected multimedia objects at user selected locations on the display device;

assigning a feature vector to each user selected multimedia object and stored multimedia object;

reducing the feature vector to a location vector to a location vector having a dimensionality of the display device;

evaluating a cost function to determine an optimal location vector for each multimedia object, and an optimal size for each multimedia object, wherein the cost function maximizes a total visibility of the plurality of stored multimedia objects and minimizes a total deviation between the location vectors and the optimal location vectors, and wherein the cost function J is a linear combination J of a first function F(p) and second cost function G(p)

$$J = F(p) + \lambda \cdot S \cdot G(p)$$

where the first cost function maximizes the total visibility, and the second cost function minimizes the total deviation, S is a scaling factor, and $\lambda$ is a weight; and displaying each stored multimedia object on a display device according to the optimal location vector and the optimal size and a similarity to the user selected multimedia objects placed on the display device.

2. The method of claim 1 wherein the feature vector includes visual features.

3. The method of claim 1 wherein the feature vector includes semantic features.

4. The method of claim 1 wherein the feature vector includes audio features.

5. The method of claim 1 wherein the feature vector includes motion features.

6. The method of claim 1 wherein the feature vector includes color, texture, and structure features.

7. The method of claim 1 wherein the feature vectors include ceptrum, temporal trajectories, pitch, and zero crossing rate features.

8. The method of claim 1 wherein the location vector uses Cartesian coordinates.

9. The method of claim 1 wherein the location vector uses polar coordinates.

10. The method of claim 9 further comprising:

reducing a size of particular stored multimedia objects to maximize the total visibility.

11. The method of claim 10 wherein the reduced size is greater than a threshold minimum size.

12. The method of claim 1 further comprising:

determining a weighting vector from the set of user selected multimedia objects and the user selected location on the display device; and weighting each feature vector by the weighting vector before reducing the feature vector.

13. The method of claim 13 further comprising:
applying an affine transform to the locations before displaying each stored multimedia object on the display device according to the optimal location vector and the user selected locations on the display device.

14. The method of claim 13 further comprising:
applying a non-linear transformation to the affine transformed locations.

15. The method of claim 1 further comprising:
determining a relevance score for each displayed multimedia object; and
enhancing each displayed multimedia object according to the relevance score.

16. The method of claim 15 wherein a particular displayed multimedia object is enhanced by increasing a brightness of the particular displayed multimedia object.

17. The method of claim 15 wherein a particular displayed multimedia object is enhanced by increasing a contrast of the particular displayed multimedia object.

18. The method of claim 1 wherein principle component analysis is applied to each feature vector to reduce the dimensionality of the feature vector.

19. The method of claim 1 further comprising:
providing a clustering of the user selected multimedia objects placed by the user on the display device;
extracting as a weighting vector from the clustering of the user selected multimedia objects; and
displaying each stored multimedia object on the display device according to the optimal location vector and the optimal size, and the weighting vector to match the clustering of the user selected multimedia objects placed by the user on the display device.

* * * * *